(12) United States Patent
You et al.

(10) Patent No.: US 6,243,154 B1
(45) Date of Patent: Jun. 5, 2001

(54) LIQUID CRYSTAL DISPLAY HAVING WIDE VIEWING ANGLE WITHOUT COLOR SHIFT HAVING ANNULAR PIXEL AND COUNTER ELECTRODES

(75) Inventors: Jae Geon You, Ich'on; Jang Sick Park, Seoul; Bong Gyu Rho, Suwon, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/209,075

(22) Filed: Dec. 10, 1998

(30) Foreign Application Priority Data

Dec. 11, 1997 (KR) .................................................. 97-67775

(51) Int. Cl.$^7$ ................................................. G02F 1/1343
(52) U.S. Cl. ............................................................... 349/141
(58) Field of Search ............................................... 349/141

(56) References Cited

U.S. PATENT DOCUMENTS

| | | | |
|---|---|---|---|
| 5,745,207 | 4/1998 | Asada et al. ........................... | 349/141 |
| 5,760,854 | 6/1998 | Ono et al. ............................... | 349/38 |
| 5,771,085 | 6/1998 | Ochi et al. .............................. | 349/158 |
| 5,847,413 | * 12/1998 | Yamazaki et al. ...................... | 257/72 |
| 5,977,562 | * 11/1999 | Hirakata et al. ....................... | 349/141 |

FOREIGN PATENT DOCUMENTS

| | | |
|---|---|---|
| 06289398 | 10/1994 | (JP) . |
| 06331988 | 12/1994 | (JP) . |
| 07013203 | 1/1995 | (JP) . |
| 07159786 | 6/1995 | (JP) . |
| 08160469 | 6/1996 | (JP) . |
| 09230311 | 9/1997 | (JP) . |
| 09304748 | 11/1997 | (JP) . |
| 10048671 | 2/1998 | (JP) . |
| 10170920 | 6/1998 | (JP) . |

* cited by examiner

*Primary Examiner*—Walter J. Malinowski
(74) *Attorney, Agent, or Firm*—Ladas & Parry

(57) ABSTRACT

Disclosed is an LCD preventing color shift and simultaneously improving the characteristics of viewing angle. The LCD comprises a substrate and a common electrode and a pixel electrode having same spiral shape formed on the substrate and being opposed each other, wherein an electric field formed between the common electrode and the pixel electrode is radial shape.

2 Claims, 3 Drawing Sheets

LIQUID CRYSTAL DISPLAY HAVING WIDE VIEWING ANGLE WITHOUT COLOR SHIFT HAVING ANNULAR PIXEL AND COUNTER ELECTRODES

BACKGROUND OF THE INVENTION

1. Field of the Invention

The present invention relates to a liquid crystal display device (hereinafter LCD), more particularly to an LCD having a wide viewing angle without color shift.

2. Background of the Invention

An LCD has the characteristics of light weight, thin thickness and low power consumption. It has been used in various information display terminals or visual equipment. The major operating mode for the LCD can be the twisted nematic("TN") and the super twisted nematic("STN"). Though they are presently commercially used in various LCD means, the characteristic of narrow viewing angle has still remained unsolved.

An In-Plane Switching(IPS) mode LCD has been suggested to solve the foregoing problems.

FIG. 1 is a plane view showing a general IPS mode LCD. A common electrode 11 is formed on the substrate 10 in the form of comb. A pixel electrode 13 is also formed on the substrate 10 in the form of comb, the comb-like electrodes 11 and 13 form a teeth shape. When an external voltage is applied between the common electrode 11 and the pixel electrode 13, an electric field F1 is formed therebetween and the liquid crystal molecules 15 are moved such that their long axes are parallel to the electric field F1.

There is a color shift in the direction of long and short axes due to the optical anisotropy since the long and short axes of liquid crystal molecule are different from each other in length.

As well known, the refractive anisotropy(or birefringence, $\Delta n$) has occurred due to the difference of the lengths of the long and the short axes. The refractive anisotropy($\Delta n$) is also varied from the observer's viewing directions. Therefore a predetermined color is appeared on the region where the polar angle if 0 degree and the azimuth angles range of degrees 0, 90, 180 and 270 in spite of the white state. This results in color shift and more detailed description thereof is attached with reference to the equation 1.

$$T \approx T_0 \sin^2(2\chi) \cdot \sin^2(\pi \cdot \Delta n d / \lambda) \quad \text{equation 1}$$

wherein,

T : transmittance;

$T_0$: transmittance to the reference light;

$\chi$: angle between an optical axis of liquid crystal molecule and a polarizing axis of the polarizing plate;

$\Delta n$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta n d/\lambda$ should be $\pi/2$ according to the equation 1. As the $\Delta n d$ varies with the birefringence difference of the LC molecules from viewing directions, the $\lambda$ value is varied in order to make $\Delta n d/\lambda$ to be $\pi/2$. According to this condition, the color corresponding to the varied wavelength $\lambda$ appears.

Accordingly, as the value of $\Delta n$ relatively decreases at the viewing direction "a" toward the short axes of the LC molecules, the wavelength of the incident light for obtaining the maximum transmittance relatively decreases. Consequently a blue color having shorter wavelength than a white color is emerged.

On the other hand, as the value of $\Delta n$ relatively increases at the viewing direction "b" toward the short axes of the LC molecules, the wavelength of incident light relatively increases. Consequently a yellow color having a longer wavelength than the white color is emerged. This causes deterioration to the resolution of IPS-LCDs.

To prevent the above disadvantages caused by color shift, a method for forming multi-domain within a unit pixel has been suggested. According to this method, one portion of an alignment layer is rubbed to a first direction, the other portion of the alignment layer is rubbed to second direction symmetrized the first direction. This method, however, is required additional masks compared to the conventional process of liquid crystal molecules alignment.

SUMMARY OF THE INVENTION

Accordingly, one object of the invention is to provide a LCD having wide viewing angle without color shift occurrence.

Another object of the present invention is to provide a method for fabricating such LCD mentioned above.

So as to accomplish the objects for the present invention, an LCD, comprising: a substrate; and a common electrode and a pixel electrode having same spiral shape formed on the substrate and being opposed each other, wherein an electric field formed between the common electrode and the pixel electrode is radial shape.

Further, the present invention provides an LCD having an electric field formed in parallel to surface of a substrate, comprising; a common electrode formed on the substrate with annular shape whose both edges are spaced each other; and pixel electrode formed on the substrate with annular shape whose both edges are spaced each other corresponding to the shape of the common electrode, wherein an electric field formed between the common electrode and the pixel electrode is radial shape and symmetric shape which is based on the kernel of respective electrode.

Also, to accomplish the above objects, the present invention provides a method for fabricating an LCD comprising the step of: forming a common electrode of spiral shape on a substrate; forming a pixel electrode of spiral shape to be opposed the common electrode; and coating an alignment layer on the surface of the substrate where the common electrode and the pixel electrode are disposed thereon, wherein a radial electric field is formed when a voltage is applied between the common electrode and the pixel electrode.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, preferred embodiments of the invention will be described in detail with reference to attached drawings.

Figure 1:
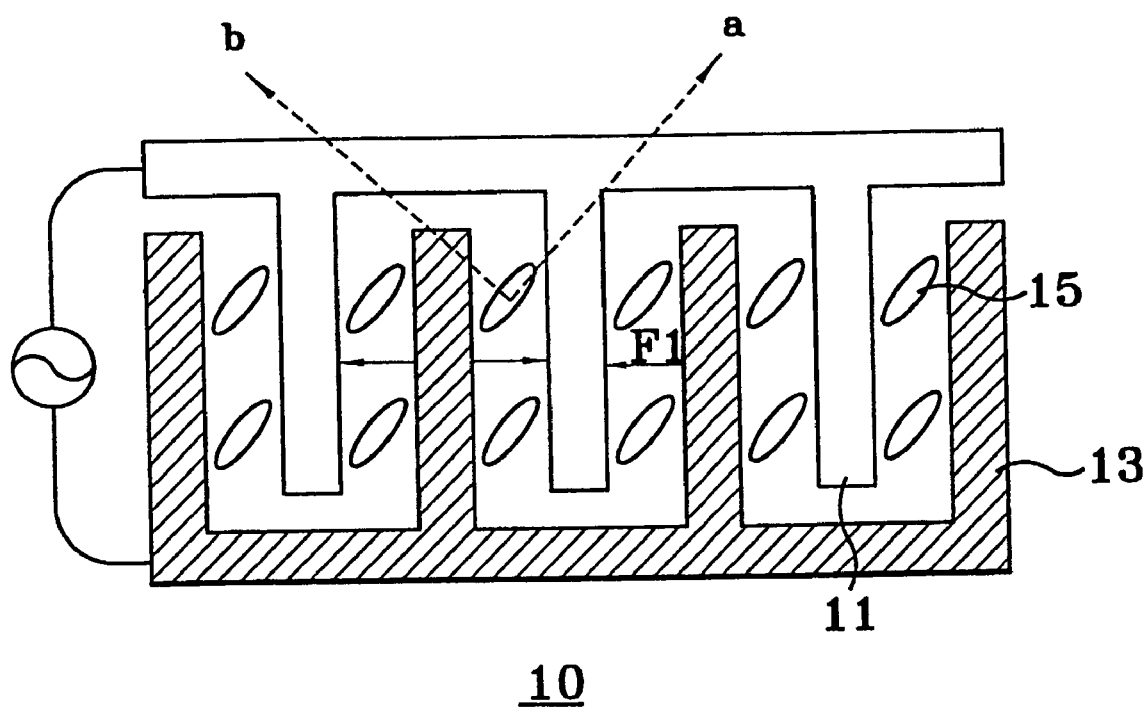
FIG. 1 is a plane view showing a general IPS mode LCD.
Figure 2A:
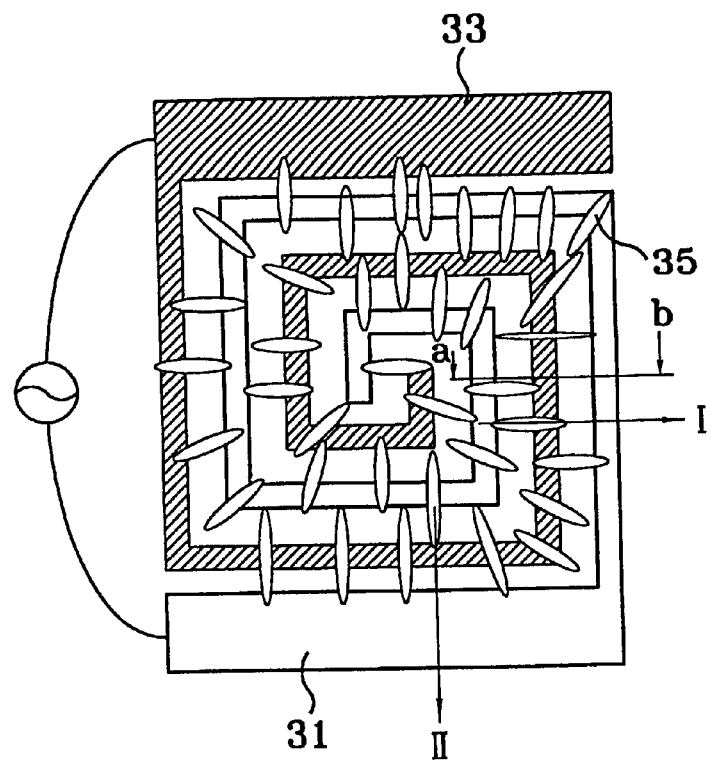
FIG. 2a is a plane view showing an electrode structure and an arrangement of liquid crystal molecules in LCD according to one embodiment of the present invention.
Figure 2B:
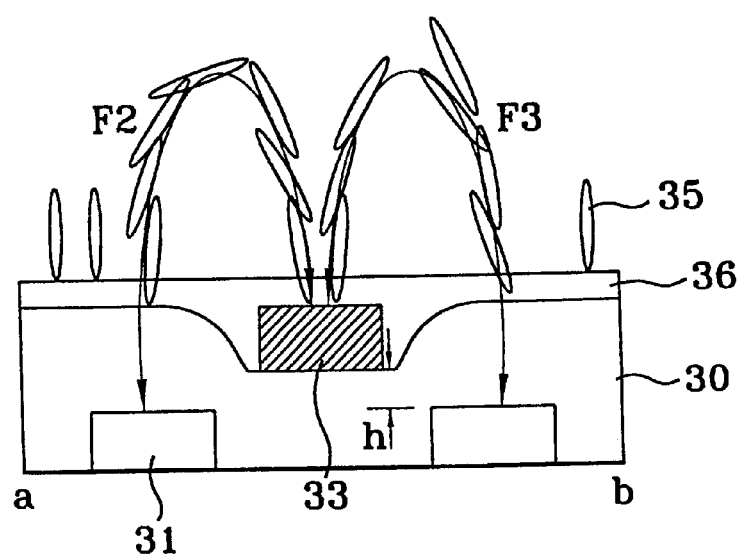
FIG. 2b is a cross sectional view showing an electrode structure of LCD according to another embodiment of the present invention.

FIG. 2a and FIG. 2b are drawings for showing liquid crystal molecule of positive dielectric anisotropy when it is vertically aligned. A common electrode 31 and pixel electrode 33 of squared spiral structure are opposed.

An electric field is formed across the common electrode 31 and the pixel electrode 33 when an external voltage is applied therebetween. At this time, the electric field has a radial shape since the common electrode 31 and the pixel electrode 33 are spiral shaped, then liquid crystal molecules 35 are aligned along the electric field of the radial shape. Accordingly, long axes and short axes of liquid crystal molecules are observed at the same time by the user in every azimuth angle of the screen. Therefore, the color shift is not occurred, since optical anisotropy is compensated.

FIG. 2b is a cross-sectional view taken along the line a–b of FIG. 2a and the electric field is indicated as arrows. As shown in the drawings, liquid crystal molecules 35 are symmetrical due to the electric field's being symmetrical. A common electrode 31 is formed on the substrate used as an upper or a lower plate for LCD(not shown) and an insulating layer 30 is deposited thereon. A pixel electrode 33 is formed on the insulating layer 30 not to overlap the common electrode 31. The height difference referenced as "h" between the upper of pixel electrode and the lower of the common electrode is decided according to the thickness of insulating layer 30. Although, FIG. 2b shows the formation of pixel electrode 33 on the common electrode 31 by an insulating layer 30, it is also available that the common electrode 31 and the pixel electrode 33 are formed on the same plane without the height difference "h". Thereafter an alignment layer 36 is formed on the pixel electrode 33 and the insulating layer 30. The alignment layer 36 is a homeotropic layer which needs no rubbing treatment.

Therefore according to this embodiment, liquid crystal molecules 35 are aligned radially in accordance with electrode 31,33 structure without some times rubbing process.

Figure 3:
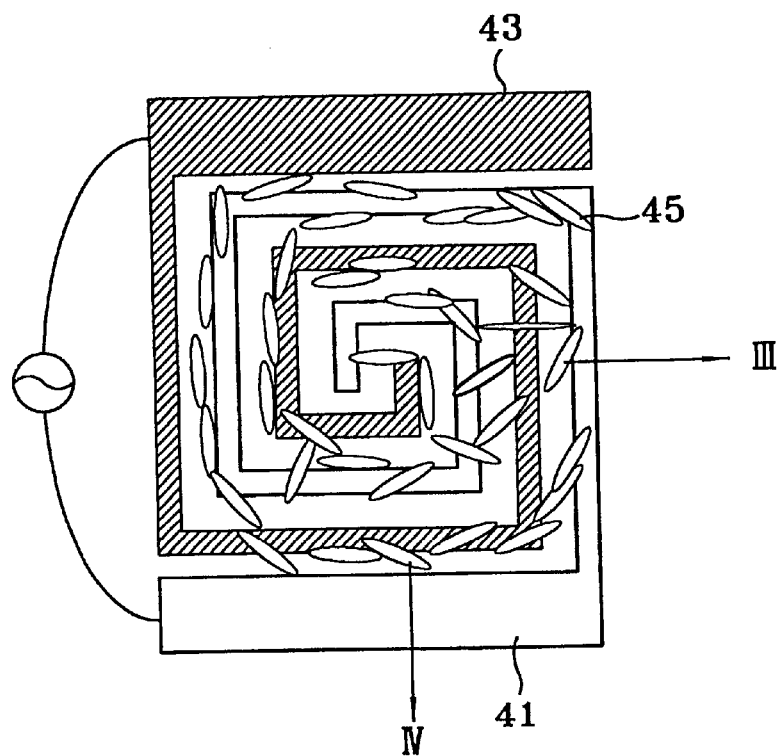
FIG. 3 is a plane view showing a liquid crystal molecules of negative dielectric anisotropy according to one embodiment of the present invention.

FIG. 3 shows liquid crystal molecules 45 of negative dielectric anisotropy used in the electrode structure of FIG. 2a. The liquid crystal molecules 45 are aligned substantially in a same direction of the liquid crystal molecules 35 of FIG. 2a except the liquid crystal molecules 45 aligned such that their short axes are perpendicular to the direction of electric field. Namely, the liquid crystal molecules 45 are aligned in symmetric configuration based on kernel of the pixel electrode 43 of spiral shape. Accordingly, the optical anisotropy which depends upon the viewing angles III and IV is equal to each other.

Although FIG. 2a and FIG. 3a show a square type spiral structure, the square can be replaced with a circle or a triangle.

Figure 4:
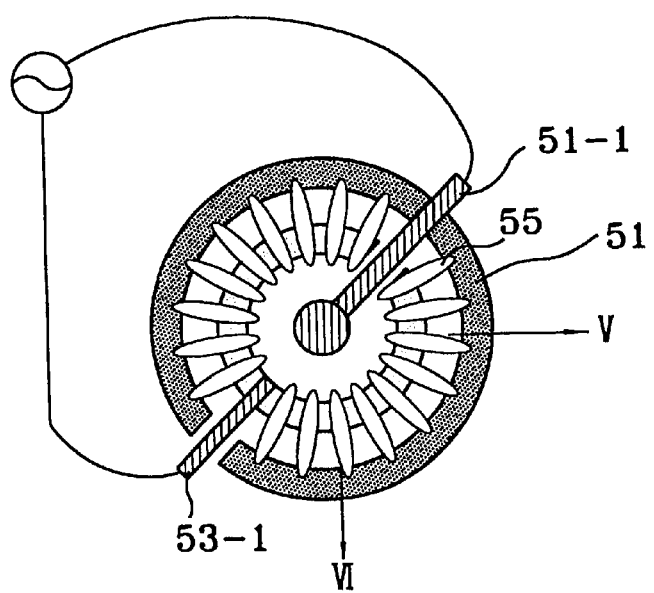
FIG. 4 is a plane view showing an electrode structure of an LCD according to another embodiment of the present invention.

FIG. 4 shows another embodiment of the invention, where a common electrode 51 and a pixel electrode 53 are shaped of annular whose both edges are separated each other such as the letter "C". Those electrodes include withdrawal rods 51-1 and 53-1 which are withdrawn to the exterior of the band so as to be applied an external voltage. When an external voltage is applied to the common electrode 51 and the pixel electrode 53 through those rods 51-1 and 53-1, a radial electric field is formed and then the liquid crystal molecules 55 are aligned along the direction of the electric field. The optical isotropy of liquid crystal molecule 55 equals each other. That means, the equal value of optical anisotropy in a viewing angle (V) and in a viewing angle (VI) prevents color shift and enhances the characteristics of viewing angle.

The electrode structure of FIG. 4 may be applied to the liquid crystal molecules of positive dielectric anisotropy as well as those of negative dielectric anisotropy. The electrode are also changeable as long as electric field is symmetrical from all directions based on central portion of the electrode.

Further, the pixel and the common electrodes can be disposed on the same plane and can be disposed by insulating layer upwardly with a predetermined height.

As described above, the liquid crystal molecules are symmetrical against all direction of views since the common electrode and the pixel electrode are arranged for forming the electric field to be radial shape. Therefore the liquid crystal molecules have the same optical isotropy which prevents color shift of the conventional IPS mode devices and improving the characteristics of viewing angle.

Also this invention can reduce manufacturing steps and masks since additional rubbing processes are not required.

While only preferred embodiments have been discussed and described, various changes and modifications can be made without departing from the spirit and scope of the invention as defined by the following claims.

We claim:

1. An LCD having an electrode field formed in parallel to a surface of a substrate, comprising:

a common electrode formed on the substrate with an annular shape and having a first edge spaced apart from a second edge; and a pixel electrode formed on the substrate with an annular shape and a third edge spaced apart from a fourth edge corresponding to the shape of the common electrode;

wherein an electrode field formed between the common electrode and the pixel electrode is radial in shape and parallel to the substrate.

2. The LCD as defined in claim 1, wherein the common electrode and the pixel electrode are on the same plane of the substrate.

* * * * *